United States Patent [19]

Farnum

[11] Patent Number: 4,702,861
[45] Date of Patent: Oct. 27, 1987

[54] FLAME RETARDANT MATERIALS

[75] Inventor: Bruce W. Farnum, Grand Forks, N. Dak.

[73] Assignee: Certified Technologies Corporation, Eden Prairie, Minn.

[21] Appl. No.: 863,056

[22] Filed: May 14, 1986

[51] Int. Cl.$^4$ .............. C09K 21/00; C09D 5/16; C09D 5/18

[52] U.S. Cl. ................................. 252/601; 8/115.6; 106/18.11; 106/18.12; 106/18.16; 106/18.31; 106/18.32; 252/607; 252/608; 252/609; 428/920; 428/921; 521/906; 521/907

[58] Field of Search ........ 252/601, 607, 608, 609–611; 428/920, 921; 427/351, 419.1, 419.2; 521/122, 906, 138, 907; 106/15.05, 18.11, 18.12, 18.15, 18.16, 18.17, 18.18, 18.31, 18.32; 8/115.51, 115.6

[56] References Cited

U.S. PATENT DOCUMENTS

| | | | |
|---|---|---|---|
| 3,560,253 | 2/1971 | Ashton | 252/601 |
| 3,699,041 | 10/1972 | Sanderford et al. | 252/601 |
| 4,011,195 | 3/1977 | Self | 521/122 |
| 4,095,985 | 6/1978 | Brown | 106/84 |
| 4,182,799 | 1/1980 | Rodish | 252/601 |
| 4,358,500 | 11/1982 | George et al. | 428/251 |
| 4,464,495 | 8/1984 | Brown | 252/601 |

Primary Examiner—Stephen J. Lechert, Jr.
Assistant Examiner—Howard J. Locker
Attorney, Agent, or Firm—Orrin M. Haugen; Thomas J. Nikolai; Frederick W. Niebuhr

[57] ABSTRACT

A flame retardant formulation for application as an aqueous working dispersion onto surfaces of normally combustible materials. Upon exposure to elevated temperatures and/or flame, the formulation creates a substantially continuous protective film as it undergoes a transition of composition, with the protective film generally encapsulating and/or enveloping the surface of the article onto which it is applied. In addition to being insulative, the film excludes oxygen from the surface of the substrate, and is capable of radiating infrared and visible light when exposed to elevated temperatures. In the formulation, and upon exposure to elevated temperatures and/or flame, the material releases forms of chlorine, bromine, and phosphorus, for the protection that these materials provide. In addition, antimony oxide is present for its protective property, together with hydrated alumina for its water-release capability.

2 Claims, No Drawings

FLAME RETARDANT MATERIALS

BACKGROUND OF THE INVENTION

The present invention relates generally to an improved flame retardant composition, and more particularly to a flame retardant formulation which is particularly adapted to be applied in aqueous working dispersion form onto surfaces of normally combustible materials including woods, fabrics of natural fiber, synthetic resin foams and fabrics, steel, and the like. The formulation of the present invention has particular efficacy in flame retardant applications as a result of its ability to create a substantially continuous protective film as it undergoes a transition of composition over a broad range of exposure to flame so as to encapsulate and surface-envelope the article and/or structure onto which it is applied. The film is insulative and excludes oxygen from the substrate. It radiates infrared and visible light at higher temperatures. Films formed with the formulation of the present invention have excellent fire retardant properties, and in addition, as films, are flexible, have excellent adhesion, and provide a coating with outstanding tensile strength.

In the past, various flame and fire retardant compositions have been proposed having particular application as a surface coating for a wide variety of materials. Traditionally, these materials have contained certain active flame or fire retardant ingredients which, in the presence of flame and/or heat, become donors and/or generators of elemental chlorine, bromine, and/or phosphorus. The acidic fire retardants also catalyze conversion of polymeric binders into graphite-like continuous char layers at temperatures below the combustion temperature range. Other formulations included oxides of antimony and the like. In the present formulation, the arrangement is such that donors of chlorine, bromine, and phosphorus are provided for their capability, as well as antimony oxide, together with a quantity of hydrated alumina for its water release capability. The result is a highly effective flame retardant material which functions well and which does not release large quantities of nascent chlorine, bromine, HCl, HBr, HCN, No or ammonia gases. Carbon monoxide and smoke emmisions are controlled to a level which is not hazardous.

Films formed with the formulation of the present invention are highly useful in the encapsulation of asbestos, with the coating having low temperature flexibility, as well as elastomeric properties which contribute to the lifetime of the finished coating. In addition, the materials have good adhesion properties, and because of the physical properties of the aqueous materials being applied, are capable of penetrating and wetting the asbestos fibers. These materials resist combustion at temperatures up to approximately 1000° F. by gradually converting from a polyvinylchloride-acrylic polymer film to a graphitic char film through chemical interaction of the polymer with the acidic fire-retardant chemicals present in the formulation. Additionally, acid gas emissions such as gaseous hydrogen chloride, hydrogen bromide, and hydrogen phosphate are moderated and controlled in part by chemical reaction with the calcium carbonate component. It has been found that at temperatures of between about 1000° F. and 2000° F., a continuous inorganic film is formed which functions as a refractory fire barrier, with the film integrity being maintained by interactions of pigment components of the formulation so as to establish, create, and form a substantially continuous coating with ceramic properties.

SUMMARY OF THE INVENTION

The present formulation forms a substantially continuous film or coating from a working aqueous latex dispersion. The individual components are present in the formulation, and have been found to provide a synergistic effect in the reduction of smoke, retardation of flame spread rates, as well as other conventional fire-retardant features.

The flame retardant composition, when mixed with sodium silicate, can be used to bind insulative forms by rapid-curing with carbon dioxide gas under moderate pressure to create a highly fire resistant insulative barrier. Since the fire retardant capabilities are provided in a film-forming binder, the formulation may be utilized as a coating for ceramic materials, including vermiculite, perlite, fibrous ceramics, and the like containing layers, and have further application as well. Specifically, the fire retardant capabilities of the formulations of the present invention may be utilized to coat or encapsulate layers of in-place asbestos, thus sealing and/or lodging the asbestos fibers in place.

The excellent binding and particle wetting capability of the formulation, combined with its flexibility, make it particularly useful for binding and sealing asbestos fibers in place; while the fire retardant capabilities of the coating contribute to maintaining the original usefulness of the coated asbestos as a fire resistant material. The encapsulation of the asbestos by the formulation is effective in preventing surface erosion and thereby preventing the release of air-borne asbestos particulate matter.

The film-forming materials of the present invention are based upon an aqueous latex dispersion of polyvinylchloride-acrylic copolymer together with certain other film-forming and viscosity-controlling components. Certain of these components have dual functions in the formulation, such as, for example, the incorporation of antimony pentoxide in colloidal form for its well-known fire retardant capability along with a pigment of hydrated alumina. The hydrated alumina has been found to be particularly desirable as a water release agent. A trap for acidic gases is provided in the formulation in the form of calcium carbonate, a desirable pigment, which functions as well as a high melting, film strengthening, white extender pigment.

The working dispersions of the present formulation are desirable from the standpoint of achieving full cures rapidly by water evaporation, thus achieving a full and complete curing cycle within a relatively short time span. Excellent adhesion is also achieved.

Therefore, it is a primary object of the present invention to provide an improved fire retardant composition having particular application as a flame retardant surface coating for creation of a substantially continuous film over normally combustible materials, and wherein the film forming fire retardant agent includes halogen donors which are believed to be present as atomic and ionic chlorine and bromine functioning as free radical flame propagation inhibitors.

It is still a further object of the present invention to provide an improved fire retardant composition for forming a flame retardant surface coating of a substantially continuous film for encapsulation and enveloping of articles of wood, natural fiber, artificial fiber, foams, steel, insulation, and the like.

It is a further object of the present invention to provide a flexible film of high tensile strength at ambient temperatures and above, such as from −30° F. to ±250° F., which undergoes chemical conversion at about 1000° F. into a refractory inorganic film which sinters and vitrifies, maintaining a continuous film with ceramic properties, which continues to function at temperatures up to about 20002 F. as a fire blocking layer by deflecting an applied flame, excluding oxygen from the substrate material, and reducing surface temperature by effective radiation of infrared and visible light.

It is yet a further object of the present invention to provide an improved fire retardant composition containing donors of the elements chlorine, bromine and phosphorus, together with oxides of antimony and aluminum.

Other and further objects of the present invention will become apparent to those skilled in the art upon a study of the following specifications and appended claims.

DESCRIPTION OF THE PREFERRED EMBODIMENT

A preferred formulation of the present invention consists of the following ingredients by weight:

EXAMPLE I

| Composition | Percent by Wt. | Function in Formulation |
|---|---|---|
| $CaCO_3$ | 8.30 | pigment and trap for acid gases |
| $Al_2O_3.3H_2O$ | 8.30 | pigment and water release agent |
| $TiO_2$ | 1.57 | pigment for hiding power and whitening |
| Nonylphenoxypoly (ethyleneoxy)ethanol | 0.60 | surfactant |
| Lecithen | 0.20 | surfactant |
| Colloidal $SiO_2$ | 1.60 | thickener |
| Polyacrylic acid | 0.55 | thickener and graphitic char former |
| Decabromodiphenyloxide | 1.87 | fire retardant |
| Isodecyldiphenyl phosphate | 4.55 | fire retardant plasticizer |
| Antimony trioxide | 1.50 | antimony oxide fire retardant extender |
| Ammonia 26 degree Baume | 0.17 | stabilize the colloidal suspensions by controlling pH on the slightly alkaline side |
| Polyvinylchloride-acrylic copolymer latex (in 50% solids) | 59.95 | Binder, film former, fire retardant polymer, graphitic char former |
| Water | 10.84 | provide a non-flammable and non-toxic dispersion solvent for convenient application properties. |

The film forming fire retardant agent of the formulation includes the polyvinylchloride-acrylic copolymer, decabromodiphenyl oxide, isodecyldiphenyl phosphate, antimony pentoxide, calcium carbonate, and hydrated alumina. These elements, when combined in the formulation, provide the film-forming and solids-containing fire retardant agent. Calcium carbonate is present to function as a white pigment, as well as a trap or getter for acidic gases generated in the course of the combustion process. The calcium carbonate is preferably finely divided, having a particle size of approximately several microns. Antimony trioxide, in the present formulation, retains released halogen in proximity to the flame, thereby extending the effectiveness of the flame retardant capability of the formulation.

Rheology control is achieved from a combination of thickening agents such as colloidal silica, Texipel and polyacrylic acid. The colloidal silica functions as a thickener, with the polyacrylic acid functioning as a thickener in combination with the polyvinylchloride-acrylic copolymer latex material. Polyvinylchloride-acrylic copolymer latex materials are, of course, commercially available.

In order to achieve uniformity and desirable application properties in the finished product, a combination of non-ionic and ionic surfactants, co-solvents and levelers such as butyl cellosolve, freeze-thaw stabilizer such as glycols, and latex particle coalescing agents, surfactant or pigment dispersion such as nonylphenoxypoly (ethyleneoxy) ethanol, lecithen, propylene glycol, is employed.

The formulation of the present invention, in working solution, may be applied to the surfaces being protected as a spray, or may, if desired, be applied as a conventional paint. Spray applications permit the coating of conventional materials such as wood and steel, as well as rigid structures and asbestos layers. Airless spray is specified by EPA for asbestos encapsulation. The curing process may be accelerated by exposure to modest temperatures, such as in the area of 200° F.

Cured coatings prepared in accordance with Example I hereinabove, when tested pursuant to ASTM E-84 procedures, have been found to provide desirable results. A smoke rating of 5 is achieved, as well as a flame spread rating of 5, with the rating of zero being based upon cement, and ratings of 100 being based upon non-treated red oak. The ASTM E-84 standard is conventional and well-konwn and accepted in the art.

The phosphate ester plasticizer in the present formulation is desirable for its hydrophobic characteristics. This component provides desirable long-term properties. This component is also desirable for its creation of low temperature flexiblity in the cured film product.

The overall formulation, when fully cured, provides a low temperature glass transition capability. This is believed due to the presence of and nature of the acrylic copolymer component of the latex, as well as the action of the plasticizer.

While the formulation set forth in Example I has been found to possess highly desirable characteristics in the finished product, certain of the components present in the formulation may be contained to a greater or lesser amount, such as within the ranges set forth in Examples II and III hereinbelow.

EXAMPLE II

| Composition | Percent Range by Weight |
|---|---|
| $CaCO_3$ | 8–16% |
| $Al_2O_3.3H_2O$ | 5–20% |
| Nonylphenoxypoly (ethyleneoxy)ethanol/ lecithin | 0.6 to 1.2% |
| Colloidal $SiO_2$ and/or Texipol | 1 to 2% |
| Polyacrylic acid | 0.5 to 1% |
| Decabromodiphenyloxide | 0.5 to 2% |
| Isodecyldiphenyl phosphate | 0.5 to 5% |
| Colloidal Antimony | 0 to 3.5% |

-continued

| Composition | Percent Range by Weight |
|---|---|
| Pentoxide (50% aqueous dispersion) | |
| Ammonia 26 degree Baume or potassium tripolyphosphate | 0.1 to 0.3% |
| Titanium dioxide and tinting pigments | 0 to 5% |
| Water (including water present in the polyvinylchloride-acrylic copolymer latex) | 35 to 50% |

EXAMPLE III

| Composition | Percent Range by Weight |
|---|---|
| $CaCO_3$ | 8–16% |
| $Al_2O_3 \cdot 3H_2O$ | 5–20% |
| Nonylphenoxypoly(ethyleneoxy)ethanol/lecithin | 0.6 to 1.2% |
| Colloidal $SiO_2$ and/or Texipol | 1 to 2% |
| Polacrylic acid | 0.5 to 1% |
| Decabromodiphenyloxide | 0.5 to 2% |
| Isodecyldiphenyl phosphate | 0.5 to 5% |
| Antimony trioxide (50% aqueous solution) | 0 to 1.75% |
| Ammonia 26 degree Baume or potassium tripolyphosphate | 0.1 to 0.3% |
| Titanium dioxide and tinting pigments | 0 to 5% |
| Water (including water present in the polyvinylchloride-acrylic copolymer latex) | 35 to 50% |

What is claimed is:

1. A flame retardant surface coating for creation of a substantially continuous film over normally combustible materials, comprising an aqueous dispersion having the following formulation:

| Composition | Percent Range by Weight |
|---|---|
| $CaCO_3$ | 8–16% |
| $Al_2O_3 \cdot 3H_2O$ | 5–20% |
| Nonylphenoxypoly(ethyleneoxy)ethanol/lecithin | 0.6 to 1.2% |
| Colloidal $SiO_2$ and/or Texipol | 1 to 2% |
| Polyacrylic acid | 0.5 to 1% |
| Decabromodiphenyloxide | 0.5 to 2% |
| Isodecyldiphenyl phosphate | 0.5 to 5% |
| An oxide of antimony selected from the group consisting of antimony trioxide and colloidal antimony pentoxide | 0 to 1.75% |
| Ammonia 26 degree Baume' or potassium tripolyphosphate | 0.1 to 0.3% |
| Polyvinylchloride acrylic copolymer latex solids in 50% water solution | 30% |
| Water (including water present in the polyvinylchloride acrylic copolymer latex) | 35 to 50% |
| Titanium dioxide and tinting pigments | 0 to 5%. |

2. A flame retardant surface coating as defined in claim 1 being particularly characterized in that said aqueous dispersion has the following formulation:

| Composition | Percent by Wt. | Function in Formulation |
|---|---|---|
| $CaCO_3$ | 8.30 | pigment and trap for acid gases |
| $Al_2O_3 \cdot 3H_2O$ | 8.30 | pigment and water release agent |
| $TiO_2$ | 1.57 | pigment for hiding power and whiteness |
| Nonylphenoxypoly(ethyleneoxy)ethanol | 0.60 | surfactant |
| Lecithin | 0.20 | surfactant |
| Colloidal $SiO_2$ | 1.60 | thickener |
| Polyacrylic acid | 0.55 | thickener and graphitic char former |
| Decabromodiphenyl-oxide | 1.87 | fire retardant |
| Isodecyldiphenyl phosphate | 4.55 | fire retardant plasticizer |
| Antimony trioxide | 1.50 | antimony oxide fire retardant extender |
| Ammonia 26 degree Baume | 0.17 | stabilize the colloidal suspensions by controlling pH on the slightly alkaline side |
| Polyvinylchloride-acrylic copolymer latex (in 50% solids) | 59.95 | Binder, film former, fire retardant polymer, graphite char former |
| Water | 10.84 | provide a non-flammable and non-toxic dispersion solvent for convenient application properties. |

* * * * *